(12) United States Patent
Ishida (10) Patent No.: US 11,632,484 B2
(45) Date of Patent: Apr. 18, 2023

(54) IMAGE PROCESSING APPARATUS AND NON-TRANSITORY COMPUTER READABLE MEDIUM FOR PREVENTING DISCLOSURE OF CONTENTS OF IMAGE DATA

(71) Applicant: FUJIFILM Business Innovation Corp., Tokyo (JP)

(72) Inventor: Keitaro Ishida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 442 days.

(21) Appl. No.: 16/526,994

(22) Filed: Jul. 30, 2019

(65) Prior Publication Data

US 2020/0053247 A1  Feb. 13, 2020

(30) Foreign Application Priority Data

Aug. 10, 2018 (JP) .............................. JP2018-151691

(51) Int. Cl.
  *H04N 1/32* (2006.01)
  *H04N 1/00* (2006.01)
  *G06F 21/31* (2013.01)

(52) U.S. Cl.
  CPC ............. *H04N 1/324* (2013.01); *G06F 21/31* (2013.01); *H04N 1/00209* (2013.01)

(58) Field of Classification Search
  None
  See application file for complete search history.

(56) References Cited

U.S. PATENT DOCUMENTS

| | | | | |
|---|---|---|---|---|
| 6,809,836 B1 * | 10/2004 | Nobuta | ............... | H04N 1/33315 358/1.15 |
| 7,519,302 B2 * | 4/2009 | Matsuhara | ......... | G03G 15/5091 399/80 |
| 2006/0233563 A1 * | 10/2006 | Matsuhara | ......... | G03G 15/5091 399/80 |
| 2006/0274360 A1 * | 12/2006 | Fukui | .................... | G06F 21/608 358/1.15 |
| 2007/0136598 A1 * | 6/2007 | Endo | ................... | H04N 1/00204 713/176 |
| 2009/0257078 A1 * | 10/2009 | Sawada | ................. | G06F 21/608 358/1.14 |
| 2009/0262201 A1 * | 10/2009 | Kuwata | .................... | H04N 1/21 348/207.1 |
| 2010/0238501 A1 * | 9/2010 | Fujimaki | ................. | H04L 67/02 358/1.15 |

(Continued)

FOREIGN PATENT DOCUMENTS

JP  2007166049  6/2007

*Primary Examiner* — Miya J Williams
*Assistant Examiner* — Pawan Dhingra
(74) *Attorney, Agent, or Firm* — JCIPRNET (57) ABSTRACT

An image processing apparatus includes: a setting unit that makes authentication print settings such that when authentication information is inputted after image data is received, printing is executed based on the image data; and a transfer unit that, when the image data is received with the authentication print settings, in response to input of the authentication information, transfers the image data to a different apparatus, and when the image data is received without the authentication print settings, transfers the image data to the different apparatus regardless of input of the authentication information.

10 Claims, 6 Drawing Sheets

(56) References Cited

U.S. PATENT DOCUMENTS

| | | | |
|---|---|---|---|
| 2010/0328720 A1* | 12/2010 | Suzuki | G06F 3/1204 358/1.15 |
| 2013/0286425 A1* | 10/2013 | Nakamura | G06F 3/122 358/1.13 |
| 2014/0002848 A1* | 1/2014 | Matsumae | G06F 3/1238 358/1.14 |
| 2016/0077771 A1* | 3/2016 | Monden | H04N 1/00474 358/1.14 |
| 2016/0150120 A1* | 5/2016 | Inoue | H04N 1/32096 358/440 |
| 2016/0173730 A1* | 6/2016 | Kasuya | G06F 3/1238 358/1.14 |
| 2017/0277480 A1* | 9/2017 | Sarigumba | G06F 3/1203 |
| 2018/0284678 A1* | 10/2018 | Miyamoto | G06F 3/1296 |
| 2019/0391770 A1* | 12/2019 | Sakuragi | H04N 1/4413 |

* cited by examiner

IMAGE PROCESSING APPARATUS AND NON-TRANSITORY COMPUTER READABLE MEDIUM FOR PREVENTING DISCLOSURE OF CONTENTS OF IMAGE DATA

CROSS-REFERENCE TO RELATED APPLICATIONS

This application is based on and claims priority under 35 USC 119 from Japanese Patent Application No. 2018-151691 filed on Aug. 10, 2018.

BACKGROUND

(i) Technical Field

The present disclosure relates to an image processing apparatus and a non-transitory computer readable medium.

(ii) Related Art

For instance, Japanese Unexamined Patent Application Publication No. 2007-166049 discloses an image input/output apparatus that receives and sends data from and to a client device using a confidential box. In the image input/output apparatus, a user's electronic certificate stored in the client device is obtained from the client device, a confidential box of a user is created in a storage area of the image input/output apparatus based on the electronic certificate, data to be accumulated in the confidential box is encrypted using a public key included in the electronic certificate, and data is received and sent in the form of encrypted data.

SUMMARY

Settings may be made such that when image data is received, printing of the image data is not executed unless authentication information is inputted. In contrast, when image data is received, the received image data may be transferred to a different apparatus. If the received image data is transferred to different apparatus regardless of the settings that printing of the image data is not executed unless authentication information is inputted, the contents of the image data are disclosed to users who access the different apparatus.

Aspects of non-limiting embodiments of the present disclosure relate to prevention of disclosure of the contents of image data against the intention of an operator in the case where settings are made such that when authentication information is inputted after image data is received, printing is executed, as compared with the configuration in which image data is transferred to a different apparatus regardless of input of the authentication information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including: a setting unit that makes authentication print settings such that when authentication information is inputted after image data is received, printing is executed based on the image data; and a transfer unit that, when the image data is received with the authentication print settings, in response to input of the authentication information, transfers the image data to a different apparatus, and when the image data is received without the authentication print settings, transfers the image data to the different apparatus regardless of input of the authentication information.

BRIEF DESCRIPTION OF THE DRAWINGS

Exemplary embodiment of the present disclosure will be described in detail based on the following figures, wherein.

DETAILED DESCRIPTION

Hereinafter, an exemplary embodiment of the present disclosure will be described in detail with reference to the accompanying drawings.

<Overall Configuration of Image Processing System>

Figure 1:
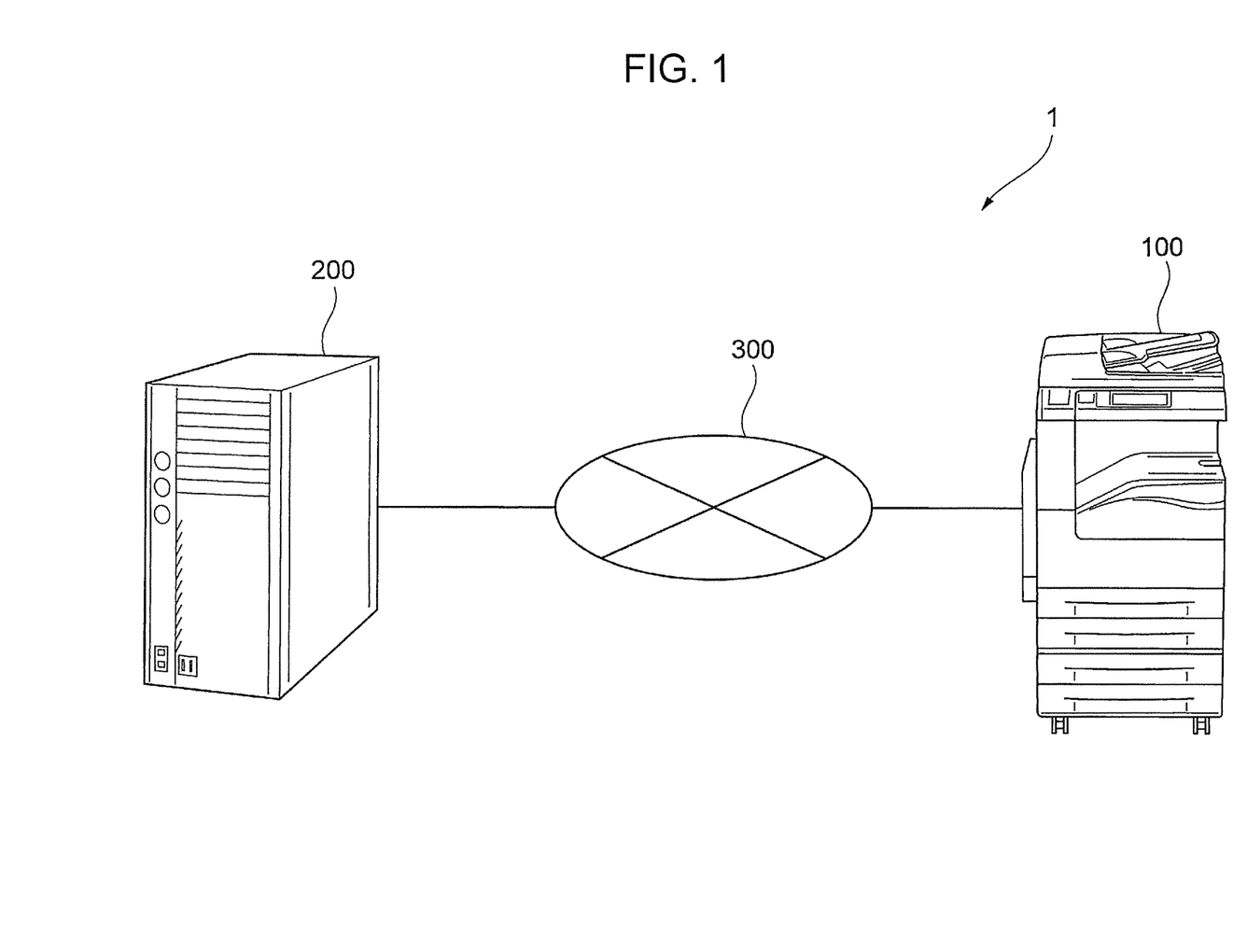
FIG. 1 is a diagram illustrating an overall configuration example of an image processing system according to an exemplary embodiment.

FIG. 1 is a diagram illustrating an overall configuration example of an image processing system 1 according to the exemplary embodiment. As illustrated, the image processing system 1 includes an image processing apparatus 100 and a server device 200. The image processing apparatus 100 and the server device 200 are connected to a network 300.

The image processing apparatus 100 is what is called a multifunction peripheral having a print function and a facsimile (FAX) function. The image processing apparatus 100 processes a print job, and performs printing by forming an image on a sheet of paper as an example of a recording material. In addition, the image processing apparatus 100 receives image data by a facsimile, performs printing based on the received image data, and transfers the received image data to a server device 200. The image processing apparatus 100 may have other image processing functions such as, an image reading function (scan function), and a duplication function (copy function). The print job includes image data to be printed, and a control command in which settings for print processing are described. The print job is data which serves as a unit of the print processing executed by the image processing apparatus 100. Hereinafter, the image data received by a facsimile may be referred to as "FAX data".

The server device 200 is a computer device that manages FAX data which is transferred from the image processing apparatus 100. The server device 200 stores the FAX data transferred from the image processing apparatus 100, and discloses the contents of the FAX data according to a request of an operator. The server device 200 assigns a password to the FAX data, and when the password is received, the contents of the FAX data may be disclosed.

The network 300 is a communication unit which is used for communication of information in the image processing apparatus 100, the server device 200, and other devices not illustrated. The network 300 includes, for instance, Internet, a local area network (LAN), and a public telephone network.

In the exemplary embodiment, authentication print settings are made in the image processing apparatus 100. The authentication print settings are such settings that when authentication information is inputted after image data is received, (in other words, provided that authentication information is inputted after image data is received), printing is executed based on the image data. Image data for which the authentication print settings are made includes image data included in a print job, and image data received by a facsimile (that is, FAX data). The authentication information is, for instance, a predetermined password in the authentication print settings.

The processing, for instance, when a print job is received will be described. When the image processing apparatus 100 receives a print job from the outside with the authentication print settings (in other words, with the authentication print settings enabled), printing is not performed until authentication information is inputted. When authentication information is inputted, image data is printed based on the print job. On the other hand, when the image processing apparatus 100 receives a print job from the outside without the authentication print settings, image data is printed based on the print job regardless of input of authentication information (in other words, without waiting for input of authentication information).

The processing, for instance, when FAX data is received will be described. Processing of FAX data includes transfer processing of FAX data in addition to printing based on the FAX data. Although the FAX data is not printed until authentication information is inputted when the authentication print settings are made, if the FAX data is transferred to the server device 200 before the authentication information is inputted, the contents of the FAX data are disclosed to any user who accesses the server device 200. When FAX data is received from the outside with the authentication print settings, the image processing apparatus 100 according to the exemplary embodiment does not print the FAX data and does not transfer the FAX data to the server device 200 until authentication information is inputted. When authentication information is inputted, the image processing apparatus 100 prints the FAX data and transfers the FAX data to the server device 200. On the other hand, when the image processing apparatus 100 receives FAX data from the outside without the authentication print settings, the FAX data is printed and transferred to the server device 200 regardless of input of authentication information (in other words, without waiting for input of authentication information).

As an additional remark, the authentication print settings may be individually made for a print job and FAX data, or common settings may be made for a print job and FAX data. When the image processing apparatus 100 receives a print job, an individual (or an individual terminal apparatus) who has transmitted the print job is identified. Specifically, for printing based on a print job, an individual who obtains a printed material is identified. Thus, authentication information for a print job is individually set (in other words, set operator by operator). Meanwhile, FAX data is transmitted by designating the image processing apparatus 100, and an individual as the destination of FAX data is not designated. Therefore, for printing based on FAX data, an individual who obtains a printed material is not identified. Thus, authentication information for FAX data is individually set for the image processing apparatus 100. Hereinafter, authentication information for FAX data is simply referred to as "authentication information". In contrast, authentication information for a print job is referred to as "individual authentication information".

<Hardware Configuration of Image Processing Apparatus>

Figure 2:
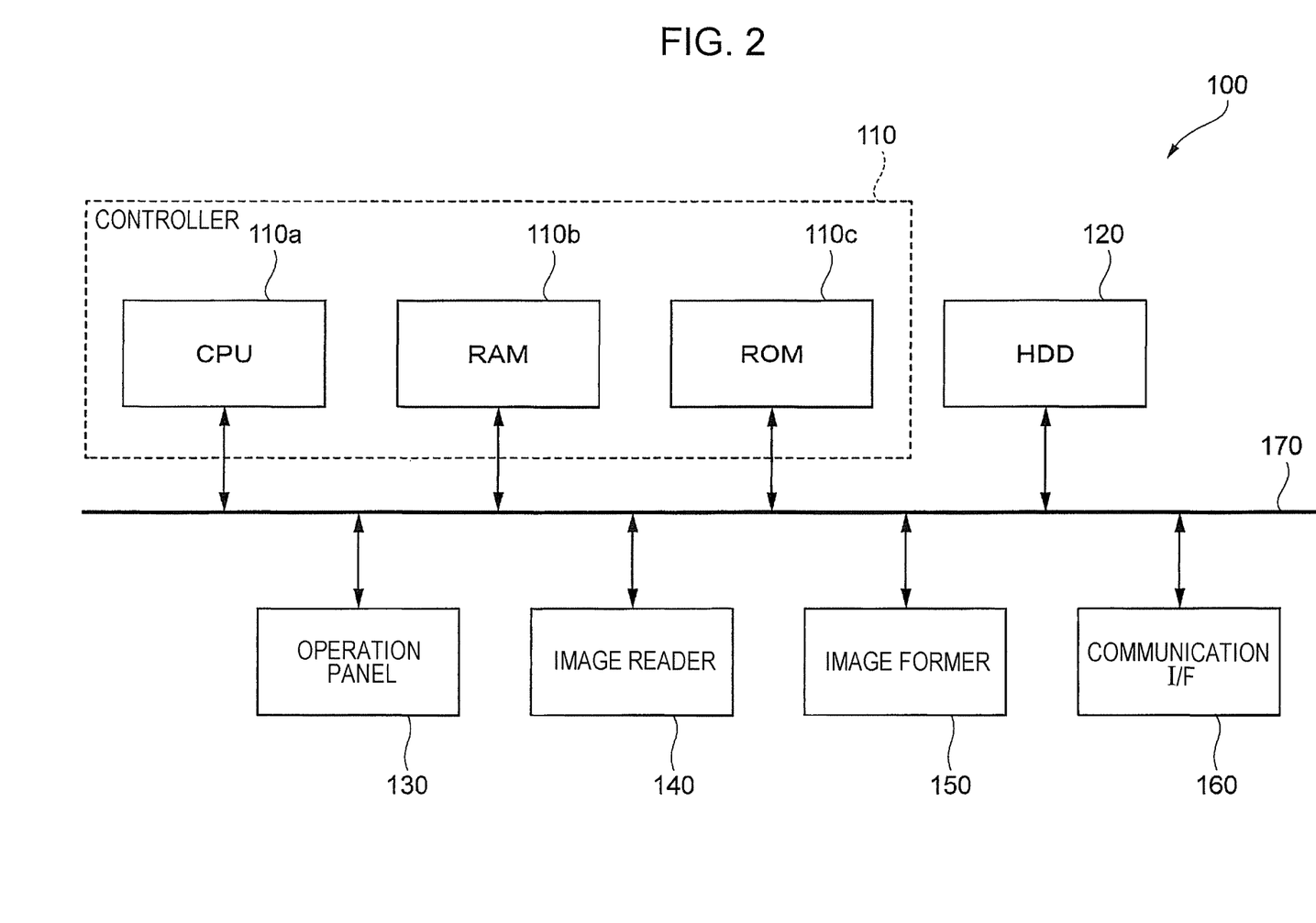
FIG. 2 is a diagram illustrating a hardware configuration example of the image processing apparatus according to the exemplary embodiment.

FIG. 2 is a diagram illustrating a hardware configuration example of the image processing apparatus 100 according to the exemplary embodiment. As illustrated, the image processing apparatus 100 according to the exemplary embodiment includes a controller 110, a hard disk drive (HDD) 120, an operation panel 130, an image reader 140, an image former 150, and a communication interface (hereinafter denoted as a "communication I/F") 160. It is to be noted that these functional components are connected to a bus 170, and data is sent and received via the bus 170.

The controller 110 controls the operation of each component of the image processing apparatus 100. The controller 110 includes a central processing unit (CPU) 110a, a random access memory (RAM) 110b, and a read only memory (ROM) 110c. The CPU 110a controls the entire image processing apparatus 100 through execution of a program (including firmware). The RAM 110b is a memory (storage) used as a working memory for the CPU 110a. The ROM 110c is a memory (storage) that stores various programs executed by the CPU 110a. The CPU 110a implements the functions of the image processing apparatus 100 by loading various programs stored in, for instance, the ROM 110c and the HDD 120 to the RAM 110b, and executing the programs.

The HDD 120 is a storage area that stores various programs such as application, input data to the various programs, and output data from the various programs. The HDD 120 stores, for instance, FAX data received from the outside by the communication I/F 160.

The operation panel 130 displays various types of information and receives an operation from an operator. The operation panel 130 includes a display panel such as a liquid crystal display, a touch panel that is disposed on the display panel and detects the position touched by an operator, and physical keys pressed by an operator. For instance, the operation panel 130 displays various screens, such as an operation screen of the image processing apparatus 100, on a display panel, and receives an operation from an operator via the touch panel and the physical keys.

The image reader 140 reads an image formed on a recording material, such as a sheet of paper, set on a platen, and generates image data which indicates the read image. The image reader 140 is, for instance, a scanner, and the CCD system or the CIS system may be used. In the CCD system, reflection of light radiated from a light source to a document is reduced by a lens and received by a charge coupled device (CCD), and in the CIS system, reflection of light sequentially radiated from an LED light source to a document is received by a contact image sensor (CIS).

The image former 150 as an example of a printing unit is a print mechanism that forms an image on a recording material such as a sheet of paper. The image former 150 is, for instance, a printer, and an electrophotographic system or an inkjet system may be used. In the electrophotographic system, toner adhering to a photorecepter is transferred onto a recording material, and an image is formed, and in the inkjet system, ink is discharged onto a recording material, and an image is formed.

The communication I/F 160 is a communication interface that transmits and receives various types of data to and from the server device 200 and other devices not illustrated via the network 300. The communication I/F 160 includes an interface for Internet connection, and an interface for a public telephone network.

<Functional Configuration of Controller of Image Processing Apparatus>

Figure 3:
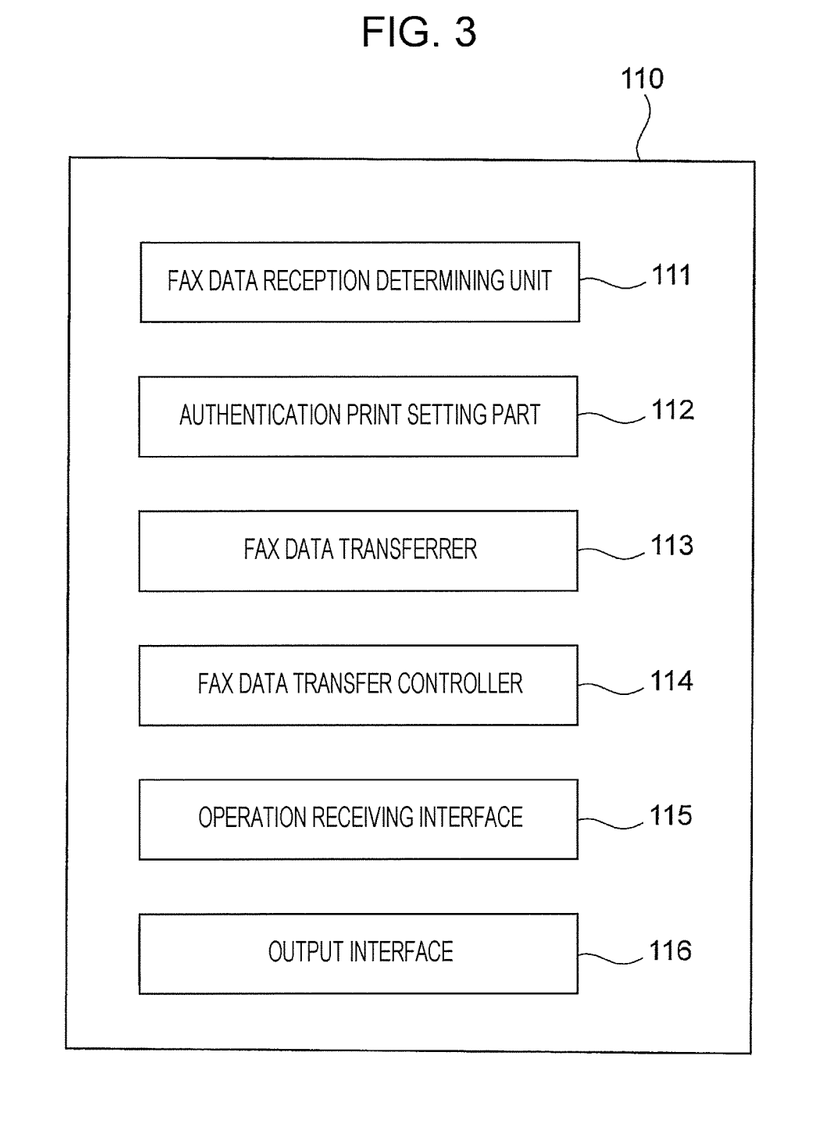
FIG. 3 is a block diagram illustrating a functional configuration example of a controller of the image processing apparatus according to the exemplary embodiment.

Next, the functional configuration of the controller 110 of the image processing apparatus 100 according to the exemplary embodiment will be described. FIG. 3 is a block diagram illustrating a functional configuration example of the controller 110 of the image processing apparatus 100 according to the exemplary embodiment. The controller 110 of the image processing apparatus 100 according to the exemplary embodiment includes a FAX data reception determining unit 111, an authentication print setting part 112, a FAX data transferred 113, a FAX data transfer controller 114, an operation receiving interface 115, and an output interface 116.

The FAX data reception determining unit 111 determines whether or not FAX data has been received from the outside.

The authentication print setting part 112 as an example of a setting unit makes the authentication print settings. Specifically, the authentication print setting part 112 enables the authentication print settings or disables the authentication print settings based on an operation of an operator, for instance. The setting status of the authentication print settings is stored in the HDD 120.

The FAX data transferrer 113 as an example of a transfer unit transfers FAX data received from the outside to the server device 200. The FAX data transferrer 113 may transfer the FAX data received from the outside to the server device 200 by converting the data format of the FAX data or without converting the data format of the FAX data.

The FAX data transfer controller 114 as an example of a transfer unit, and a transfer control unit controls the transfer performed by the FAX data transferrer 113. More specifically, when receiving FAX data from the outside, the FAX data transfer controller 114 refers to the setting status of the authentication print settings stored in the HDD 120, and determines whether or not the authentication print settings are made (in other words, the authentication print settings are enabled). When the authentication print settings are made, the FAX data transfer controller 114 does not transfer the received FAX data, and stays on stand-by until authentication information is inputted. In other words, the FAX data transfer controller 114 controls the FAX data transferrer 113 so that the FAX data is not transferred to the server device 200 until authentication information is inputted. When authentication information is inputted, the FAX data transfer controller 114 controls the FAX data transferrer 113 so that the FAX data is transferred to the server device 200. On the other hand, when the authentication print settings are not made, the FAX data transfer controller 114 controls the FAX data transferrer 113 so that the received FAX data is transferred to the server device 200 regardless of input of authentication information.

The operation receiving interface 115 as an example of a receiving unit receives an operation of an operator via the operation panel 130. Here, the operation receiving interface 115 receives an operation to input authentication information, for instance. In addition, the operation receiving interface 115 receives an operation to enable the authentication print settings and an operation to disable the authentication print settings, for instance.

When the authentication print settings are made, the output interface 116 as an example of an output unit outputs information on FAX data which has not been transferred by the FAX data transferrer 113. For instance, when the authentication print settings are made, the output interface 116 notifies an operator via e-mail of a list of the FAX data which has not been transferred by the FAX data transferrer 113.

Alternatively, for instance, the output interface 116 may display on a display panel information on the FAX data which has not been transferred by the FAX data transferrer 113. More specifically, for instance, for the FAX data which has not been transferred by the FAX data transferrer 113, the output interface 116 displays the FAX data on a display panel to allow at least one of print processing and transfer processing to the server device 200 to be designated as the processing executed when authentication information is inputted.

The functional components included in the controller 110 of the image processing apparatus 100 are implemented by cooperation between software and hardware resources. Specifically, for instance, when the image processing apparatus 100 is implemented by the hardware configuration illustrated in FIG. 2, the functional components such as the FAX data reception determining unit 111, the authentication print setting part 112, the FAX data transferrer 113, the FAX data transfer controller 114, the operation receiving interface 115, and the output interface 116 illustrated in FIG. 3 are implemented by reading various programs stored in the ROM 110c and the HDD 120 into the RAM 110b and executing the various programs by the CPU 110a, for instance.

<Description of Transfer Processing of FAX Data>

Figure 4:
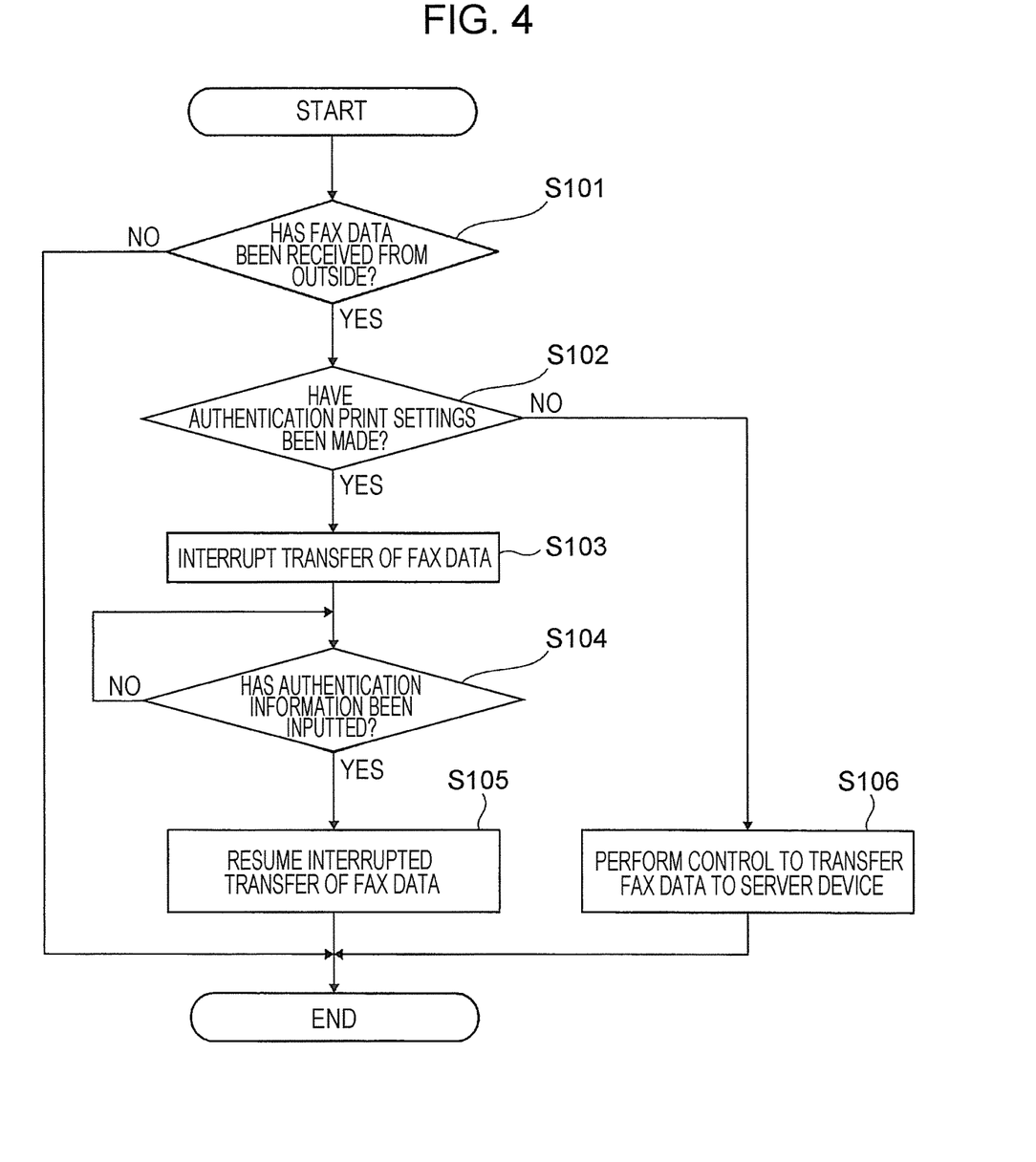
FIG. 4 is a flowchart illustrating an example of steps of processing for transferring FAX data received by the image processing apparatus from the outside.

Next, the steps of processing for transferring FAX data received by the image processing apparatus 100 from the outside will be described. FIG. 4 is a flowchart illustrating an example of steps of processing for transferring FAX data received by the image processing apparatus 100 from the outside. The processing illustrated in FIG. 4 is performed every certain period of time (every one second), for instance. Hereinafter, a step in processing may be denoted by a symbol "S".

First, the FAX data reception determining unit 111 determines whether or not FAX data has been received from the outside (S101). When negative determination (NO) is made in S101, the processing flow is terminated. On the other hand, when positive determination (YES) is made in S101, the FAX data transfer controller 114 determines whether or not the authentication print settings are made (S102).

When positive determination (YES) is made in S102, in other words, when the authentication print settings are made, the FAX data transfer controller 114 interrupts transfer of the FAX data (S103). Subsequently, the FAX data transfer controller 114 determines whether or not authentication information has been inputted (S104). The authentication information here is not set operator by operator, but is individually set for the image processing apparatus 100.

When positive determination (YES) is made in S104, the FAX data transfer controller 114 resumes transfer of the interrupted FAX data (S105). Specifically, the FAX data transfer controller 114 controls the FAX data transferrer 113 so that the FAX data is transferred to the server device 200. Also, the FAX data is printed by the image former 150. Now, the processing flow is completed.

On the other hand, when negative determination (NO) is made in S104, the processing in S104 is performed successively, and the FAX data transfer controller 114 stays on stand-by until authentication information is inputted. When negative determination (NO) is made in S102, in other words, when the authentication print settings are not made, the FAX data transfer controller 114 controls the FAX data transferrer 113 so that the FAX data is transferred to the server device 200 regardless of input of authentication information (S106). In addition, the FAX data is printed by the image former 150. Now, the processing flow is completed.

The image processing apparatus 100 may stay on stand-by for transfer of multiple pieces of FAX data until an operator inputs authentication information. For instance, when the image processing apparatus 100 receives one piece of FAX data, and further receives other piece of FAX data before authentication information is inputted, the image processing apparatus 100 stays on stand-by for transfer of the one piece of FAX data and the other piece of FAX data. When an operator inputs authentication information, the one piece of FAX data and the other piece of FAX data are transferred to the server device 200. In addition, the one piece of FAX data and the other piece of FAX data are printed.

<Specific Example of Transfer Processing of FAX Data>

Next, the processing for transferring FAX data received by the image processing apparatus 100 from the outside will be described by way of a specific example. In this example, the processing for transferring FAX data to a different apparatus is managed as a "transfer job". However, the exemplary embodiment is not limited to the configuration in which a transfer job is used.

First, FAX data is transmitted from the outside to the image processing apparatus 100 via a public telephone network, for instance. When receiving FAX data, the image processing apparatus 100 starts a transfer job for transferring the FAX data to the server device 200. The FAX data transfer controller 114 determines whether or not the authentication print settings are made. When the authentication print settings are not made, the FAX data transfer controller 114 controls the FAX data transferrer 113 so that the FAX data is transferred to the server device 200. The FAX data transferrer 113 then transfers the FAX data to the server device 200. In addition, the FAX data is printed by the image former 150.

As an additional remark, the FAX data is transferred to the server device 200, and the FAX data is stored in the server device 200, thus the FAX data may be viewed from the outside. Thus, even for FAX data addressed to oneself, the contents of FAX data may be viewed by accessing the server device 200 by another individual other than oneself (for instance, another individual in the same company for which oneself works).

When FAX data is received with the authentication print settings, the FAX data transfer controller 114 interrupts the transfer job. The FAX data transfer controller 114 stays on stand-by until authentication information is inputted. When authentication information is inputted, the FAX data transfer controller 114 compares the inputted authentication information with predetermined authentication information, and determines whether or not both pieces of authentication information match. When both pieces of authentication information match, authentication is successful, and when both pieces of authentication information do not match, authentication fails. When authentication fails, for instance, a message indicating that the authentication information is not correct is displayed on a display panel. On the other hand, when authentication is successful, the FAX data transfer controller 114 resumes the interrupted transfer job. The FAX data transferrer 113 then transfers the FAX data to the server device 200. In addition, the FAX data is printed by the image former 150.

In this manner, the FAX data is not transferred to the server device 200 until an operator inputs authentication information. For instance, when authentication information is not inputted for FAX data addressed to oneself, the contents of FAX data may not be viewed even when another individual other than oneself accesses the server device 200. In response to input of authentication information, FAX data is transferred to the server device 200, and the contents of the FAX data may be viewed in the server device 200.

When there are multiple transfer jobs interrupted, successful authentication causes the interrupted multiple transfer jobs to be resumed. Pieces of FAX data corresponding to individual transfer jobs are transferred to the server device 200. In addition, the pieces of FAX data corresponding to individual transfer jobs are printed by the image former 150.

Figure 5:
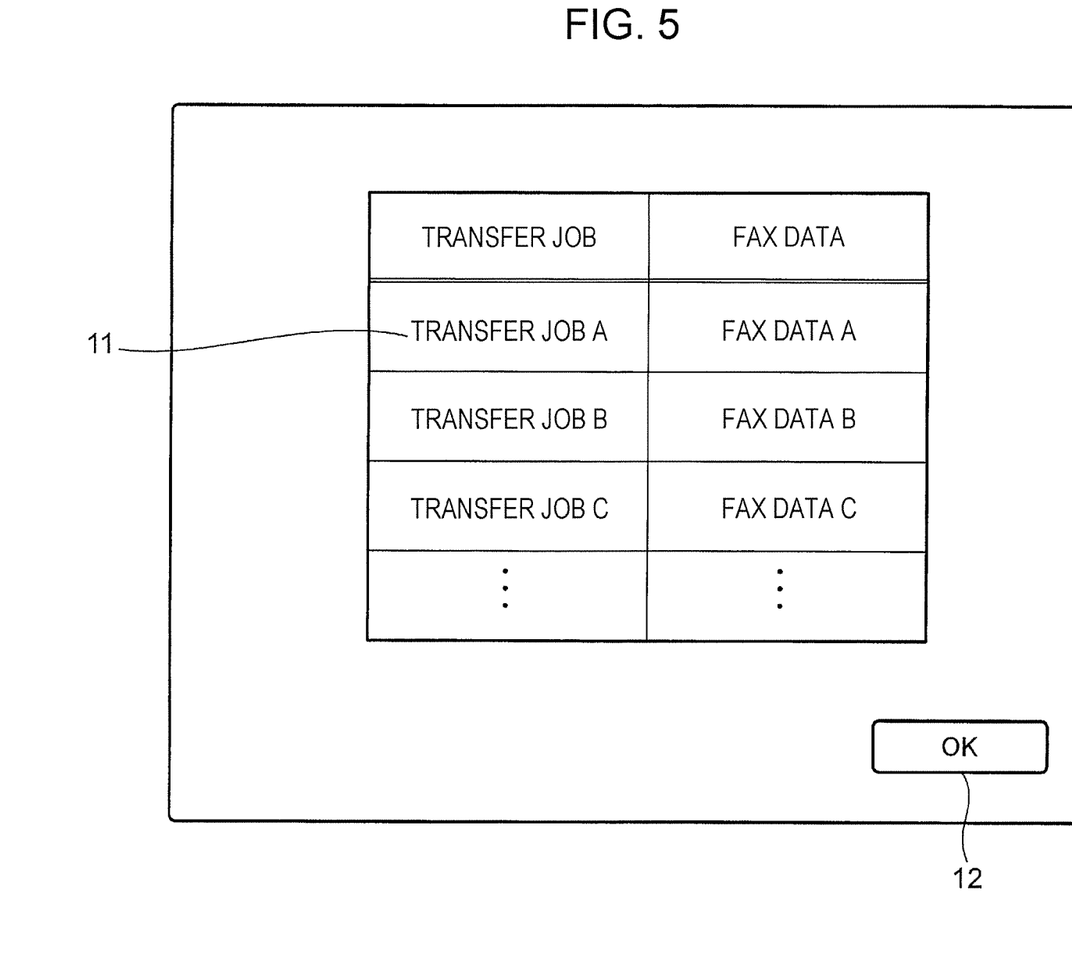
FIG. 5 is a view illustrating an example of a screen which receives selection of part of interrupted transfer jobs to be resumed.

When the authentication print settings are made, the output interface 116 notifies an operator via e-mail of a list of the interrupted transfer jobs. The destination of notification here is, for instance, an operator who has requested a list of the interrupted transfer jobs or a predetermined operator. When an operator inputs authentication information (or when authentication using authentication information is successful), a screen may be displayed, which receives selection as to whether or not the interrupted transfer jobs are resumed. FIG. 5 is a view illustrating an example of a screen which receives selection of part of interrupted transfer jobs to be resumed. In other words, the screen illustrated in FIG. 5 receives selection of part of pieces of FAX data transferred to the server device 200.

The example illustrated in FIG. 5 presents a list of interrupted transfer jobs, and transfer job A, transfer job B, and transfer job C are interrupted. An operator may select one or more transfer jobs as the transfer jobs to be resumed. For instance, when an operator selects area 11 for transfer job A, and selects "OK" button 12, when authentication using authentication information has not been performed yet, authentication is performed. When authentication is successful, the FAX data transfer controller 114 resumes the selected transfer job A. The FAX data transferrer 113 then transfers the FAX data A corresponding to transfer job A to the server device 200. In addition, the FAX data A is printed by the image former 150.

Although multiple interrupted transfer jobs are present in the example illustrated in FIG. 5, even when only one transfer job is interrupted, the screen illustrated in FIG. 5 may be displayed. The FAX data of a transfer job (transfer job A in this example) which has been transferred is deleted from the image processing apparatus 100 after printing is completed.

As described above, when FAX data is received from the outside with the authentication print settings, the image processing apparatus 100 according to the exemplary embodiment does not perform printing and transfer of FAX data until authentication information is inputted. When authentication information is inputted, the image processing apparatus 100 performs printing and transfer of FAX data.

<Another Example of Processing for FAX Data>

In the example described above, when FAX data is received with the authentication print settings, in response to input of authentication information, the FAX data transfer controller 114 performs control to transfer FAX data to the server device 200. In addition, the FAX data is printed by the image former 150. However, in the exemplary embodiment, for instance, both processing of printing and transfer of FAX data do not need to be performed, and either processing may be performed. For instance, an operator may select the contents of processing for the FAX data. Another example of processing for FAX data will be described.

(Description of Processing when Operator Inputs Authentication Information)

Figure 6:
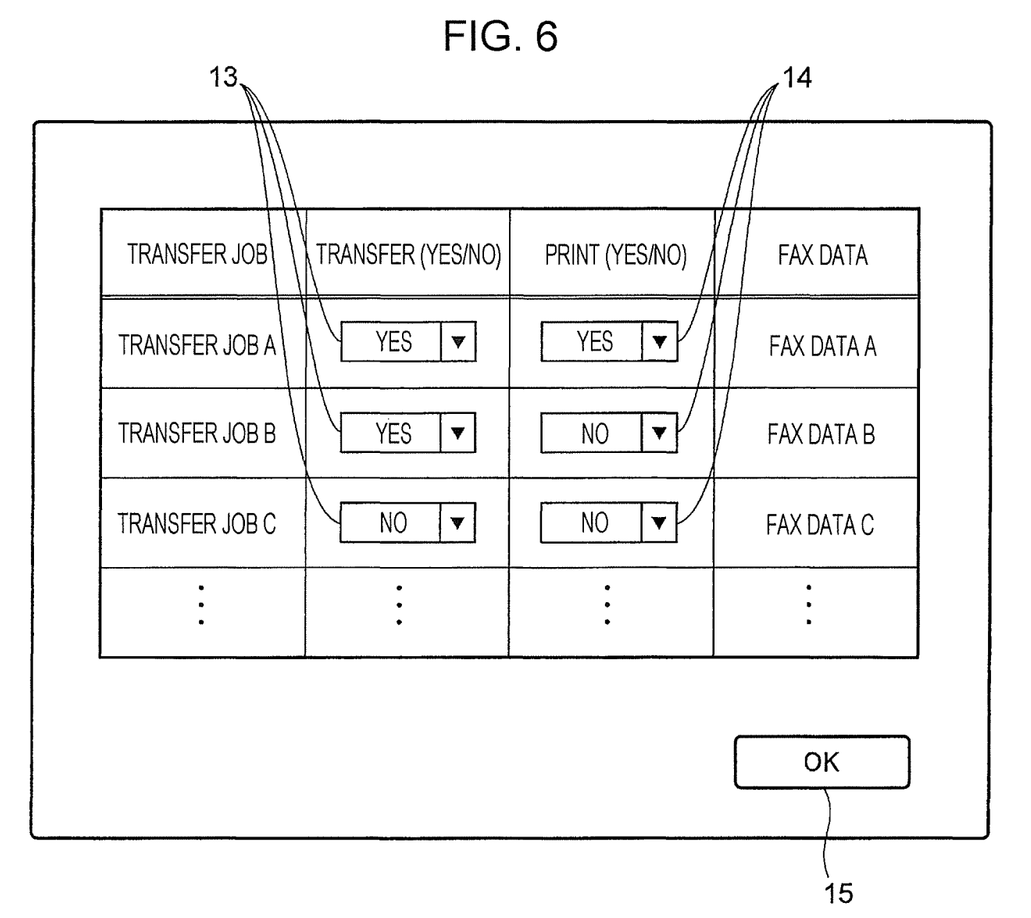
FIG. 6 is a view illustrating an example of a screen which receives selection of processing performed on the FAX data.

First, when FAX data is received with the authentication print settings, the processing performed when an operator inputs authentication information will be described. In the example described above, when an operator inputs authentication information, printing and transfer of the FAX data are performed. In the exemplary embodiment, when an operator inputs authentication information, a screen may be displayed, which receives selection of processing performed on the FAX data. FIG. 6 is a view illustrating an example of a screen which receives selection of processing performed on the FAX data.

The screen illustrated in FIG. 6 receives selection of YES/NO for transfer, and Y/N for printing for each transfer job. Specifically, in area 13 of YES/NO for transfer, "YES", "NO" are displayed for each transfer job in a pull down menu. Similarly, in area 14 of YES/NO for printing, "YES", "NO" are displayed for each transfer job in a pull down menu. An operator may select one of "YES", "NO" in area 13 of YES/NO for transfer, and area 14 of YES/NO for printing.

In the example illustrated, "NO" is set as the default (initial state) for each transfer job. An operator has selected transfer "YES", printing "YES" for transfer job A, and transfer "YES" for transfer job B, and when "OK" button 15 is selected in this state, authentication is performed provided that authentication using authentication information has not been performed yet. When authentication is successful, the FAX data transferrer 113 transfers the FAX data A corresponding to transfer job A, the FAX data B corresponding to transfer job B to the server device 200. In addition, the FAX data A is printed by the image former 150.

Although multiple interrupted transfer jobs are present in the example illustrated in FIG. 6, even when only one transfer job is interrupted, the screen illustrated in FIG. 6 may be displayed. The FAX data of a transfer job (transfer job A in this example) for which printing and transfer have been performed is deleted from the image processing apparatus 100. In contrast, the FAX data of a transfer job (transfer job B, transfer job C in this example) for which at least one processing of printing and transfer has not been performed remains to be stored in the image processing apparatus 100. However, the operation receiving interface 115 may receive selection as to whether or not FAX data is deleted for each transfer job from an operator. When an operator inputs authentication information in this manner, processing for FAX data is selected by the operator.

In the exemplary embodiment, when an operator inputs authentication information, the image processing apparatus 100 may select processing for the FAX data. For instance, the CPU 110a selects the contents of processing for the FAX data based on the common settings for all pieces of FAX data. The common settings include, for instance, "the settings for performing printing and transfer", "the settings for performing printing only", and "the settings for performing transfer only". For instance, whether or not transfer is performed may be set under the precondition that printing is performed as in "the settings for performing printing and transfer", and "the settings for performing printing only". Printing, transfer of FAX data are performed based on such setting contents.

For instance, the CPU 110a may select the contents of processing for FAX data according to the information on the FAX data. Specifically, the CPU 110a selects one of "printing and transfer", "printing only", and "transfer only", for instance, according to the information on the FAX data. The CPU 110a may select whether or not transfer is performed under the precondition that printing is performed as in "printing and transfer", "printing only" according to the information on the FAX data. It is to be noted that the information on the FAX data is, for instance, a transmission source of the FAX data, and frequency of receiving the FAX data.

For instance, the CPU 110a selects either processing based on the transmission source of the FAX data. For instance, for a transmission source which exchanges highly confidential information, "print only" is selected. For instance, for a transmission source which needs prompt handling, "printing and transfer" is selected. Furthermore, for a transmission source in which the contents of processing are not determined beforehand, the processing defined as the default (for instance, "printing and transfer") is selected. For instance, the CPU 110a selects either processing based on the frequency of receiving FAX data (or the number of receiving FAX data). For instance, for a transmission source which has never received FAX data in the past, "printing and transfer" is selected. For instance, for a transmission source which has a high frequency of receiving FAX data, the "print only" is selected to prevent the free space of the server device 200 from being reduced.

The information on FAX data is not limited to the transmission source of FAX data and the frequency of receiving FAX data. For instance, the volume of FAX data and the receiving time of FAX data may be used. When an operator inputs authentication information in this manner, processing for FAX data is selected by the image processing apparatus 100. In this case, the CPU 110a may be regarded as an example of a selecting unit.

(Description of Processing Before Operator Inputs Authentication Information)

Next, when FAX data is received with the authentication print settings, the processing performed before an operator inputs authentication information will be described. In the example described above, before an operator inputs authentication information, the image processing apparatus 100 stays on stand-by without performing printing and transfer of FAX data. In the exemplary embodiment, before an operator inputs authentication information, the image processing apparatus 100 may select processing for FAX data.

For instance, the CPU 110a selects the contents of processing for the FAX data based on the common settings for all pieces of FAX data. The common settings include, for instance, "the settings for performing transfer and not performing printing before input of authentication information (that is, regardless of input of authentication information)", "the settings for performing printing and not performing transfer before input of authentication information", and "the settings for not performing both printing and transfer before input of authentication information". Whether or not transfer is performed may be set under the precondition that printing is not performed before input of authentication information as in "the settings for transfer in response to input of authentication information", "the settings for transfer regardless of input of authentication information". Printing, transfer of FAX data are performed based on such setting contents. When authentication information is inputted, the processing which is one or both of printing and transfer and has not been performed yet is to be performed. For instance, when FAX data has not been transferred before input of authentication information, in response to input of authentication information, the FAX data is transferred. Also, when FAX data has not been printed before input of authentication information, in response to input of authentication information, the FAX data is printed. However, when authentication information is inputted, an operator may select the contents of processing for the FAX data, or the image processing apparatus 100 may select the contents of processing according to the information on the FAX data.

For instance, the CPU 110a may select the contents of processing for the FAX data according to the information on the FAX data. Specifically, the CPU 110a selects processing which is one of "transfer is performed but printing is not performed before input of authentication information", "printing is performed but transfer is not performed before input of authentication information", and "both printing and transfer are not performed before input of authentication information", for instance, according to the information on the FAX data. Also, the CPU 110a may select whether or not transfer is performed under the precondition that printing is not performed before input of authentication information as in "transfer is performed in response to input of authentication information", "transfer is performed regardless of input of authentication information" according to the information on the FAX data.

For instance, for a transmission source which exchanges highly confidential information, the processing "both printing and transfer are not performed before input of authentication information" is selected. For instance, for a transmission source which needs prompt handling, the processing "transfer is performed but printing is not performed before input of authentication information" is selected. When authentication information is inputted, the processing which is one or both of printing and transfer and has not been performed yet is to be performed. However, when authentication information is inputted, an operator may select the contents of processing for the FAX data, or the image processing apparatus 100 may select the contents of processing according to the information on the FAX data.

<Description of Another Example>

In the exemplary embodiment, while an operator is operating the image processing apparatus 100, the image processing apparatus 100 may receive FAX data. Thus, in this case, a screen may be displayed, which receives selection as to whether or not transfer of the received FAX data is interrupted. When an operator selects that transfer of the FAX data is interrupted, the FAX data transfer controller 114 interrupts transfer of the FAX data. Subsequently, when authentication information is newly inputted, the FAX data which has not been transferred is transferred to the server device 200. On the other hand, when an operator selects that transfer of the FAX data is not interrupted (in other words, the FAX data is transferred), the FAX data transfer controller 114 performs control to transfer the FAX data to the server device 200. Also, an operator may be requested to input authentication information in the FAX data before selection of the operator is received.

In the exemplary embodiment, when an operator cancels the authentication print settings in the image processing apparatus 100, in other words, when the authentication print settings are changed from an enabled state to a disabled state, the FAX data transfer controller 114 may control the FAX data transferrer 113 so that all pieces of FAX data which have not been transferred to the server device 200 (in other words, all pieces of FAX data for which transfer is interrupted) are transferred to the server device 200. In this case, all pieces of FAX data which have not been transferred are printed. However, it is not necessary to print the FAX data again which has been printed.

Furthermore, in the exemplary embodiment, when an operator cancels the authentication print settings in the image processing apparatus 100, as illustrated in FIG. 5, a screen may be displayed, which receives selection of FAX data to be transferred to the server device 200. In this case, printing and transfer of the FAX data selected by an operator are performed, and transfer of the FAX data not selected by an operator remains interrupted. As illustrated in FIG. 6, a screen may be displayed, which receives selection of processing performed on the FAX data. In this case, processing is performed on each FAX data in accordance with the selection of an operator.

Also, in the exemplary embodiment, while transfer of FAX data is interrupted, the FAX data is stored in a predetermined storage area (hereinafter, referred to as a FAX data storage area) such as the HDD 120. However, since the storage capacity of a FAX data storage area is limited, control may be performed in consideration of the storage capacity. In the exemplary embodiment, the FAX data storage area is used as an example of a storage that stores image data which has not been transferred. For instance, when authentication information has not been inputted for a predetermined period since FAX data was received, the CPU 110a may delete the FAX data to increase the free space of the FAX data storage area.

For instance, when the free space of the FAX data storage area satisfies a predetermined condition, the CPU 110a may prohibit FAX data from being received. In this case, the CPU 110a may be regarded as an example of a prohibition unit. More specifically, for instance, when the free space of the FAX data storage area is smaller than the volume of FAX data transmitted to the image processing apparatus 100, the CPU 110a may prohibit the FAX data from being received. In short, FAX data with a volume larger than the free space of the FAX data storage area may be prohibited from being received. For instance, when the free space of the FAX data storage area falls below a predetermined storage volume, the CPU 110a may prohibit new FAX data from being received.

For instance, when the free space of the FAX data storage area satisfies a predetermined condition, the CPU 110a may delete FAX data stored in the FAX data storage area in chronological order of receiving time. In this case, the CPU 110a may be regarded as an example of a deleting unit. More specifically, for instance, when the free space of the FAX data storage area is smaller than the volume of FAX data transmitted to the image processing apparatus 100 (in other words, when FAX data is received, which has a volume greater than the free space of the FAX data storage area), the CPU 110a deletes FAX data stored in the FAX data storage area in chronological order of receiving time. When the free space of the FAX data storage area becomes greater than the volume of FAX data transmitted to the image processing apparatus 100 by deleting one or more pieces of FAX data, FAX data is received and newly stored in the FAX data storage area. For instance, when the free space of the FAX data storage area falls below a predetermined storage volume, the CPU 110a may delete FAX data stored in the FAX data storage area in chronological order of receiving time.

Also, in the exemplary embodiment, the image processing apparatus 100 may display information on the received FAX data, and may receive an operation to designate a user who receives the FAX data from an operator. For instance, the image processing apparatus 100 displays on a display panel a transmission source of the FAX data, and the first page when the FAX data is printed. An operator checks the displayed information, and designates the destination of the FAX data and an expected user who receives the FAX data. When the operation receiving interface 115 receives an operation to designate the receiving user, the output interface 116 notifies the designated receiving user to designate processing which is at least one of print processing and transfer processing to the server device 200 as the processing performed on the FAX data. In response to the notification, the receiving user only needs to designate printing and/or transfer of FAX data in the image processing apparatus 100. Since the FAX data is associated with the receiving user, the receiving user only needs to input individual authentication information assigned to the receiving user individually to the image processing apparatus 100 to perform authentication rather than to input authentication information of the FAX data to the image processing apparatus 100.

Furthermore, in the exemplary embodiment, the authentication print settings are regarded that when authentication information is inputted, printing is executed based on image data. However, the authentication print settings may be regarded that when authentication information is inputted, transfer of image data is performed. In other words, the authentication print settings are used as an example of authentication transfer settings in which when authentication information is inputted after image data is received, the image data is transferred to a different apparatus such as the server device 200. For instance, when FAX data is received with the authentication transfer settings, in response to input of authentication information, the FAX data transferrer 113 transfers the received FAX data to the server device 200, and the image former 150 executes printing based on the received image data. On the other hand, when FAX data is received without the authentication transfer settings, the FAX data transferrer 113 transfers the received FAX data to the server device 200 regardless of input of authentication information, and the image former 150 executes printing based on the received image data.

Needless to say, each program that implements the exemplary embodiment of the present disclosure may be provided by a communication unit, or the program may be stored in a recording medium such as a CD-ROM, and provided.

Although various exemplary embodiment and modifications have been described above, those exemplary embodiment and modifications may be combined. The present disclosure is not limited to the above-described exemplary embodiment, and may be practiced in various forms without departing from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
make authentication print settings such that when authentication info nation is inputted after image data is received, printing is executed based on the image data;
determine whether the image data is received with the authentication print settings;
when the image data is received without the authentication print settings, transfer the image data to a different apparatus other than a transmission source of the received image data regardless of input of the authentication information; and
when the image data is received with the authentication print settings, determine whether the authentication information has been inputted;
when receiving input of the authentication information, select one of printing only, transfer only, and both printing and transfer based on the authentication print settings, wherein
the processor selects the printing only in which only printing is performed based on the image data when the transmission source exchanges confidential information;
the processor selects the transfer only in which the transfer of the image data to the different apparatus is performed when contents of processing are determined for the transmission source in the authentication print settings; and
the processor selects the both printing and transfer in which printing based on the image data and the transfer of the image data to the different apparatus are performed when the contents of processing are not determined for the transmission source in the authentication print settings.

2. The image processing apparatus according to claim 1, wherein
when the authentication print settings are made, the processor outputs information of image data which has not been transferred.

3. The image processing apparatus according to claim 2, wherein for image data which has not been transferred, the processor displays the image data to allow at least one of print processing and transfer processing to the different apparatus to be designated as processing executed when the authentication information is inputted.

4. The image processing apparatus according to claim 1, wherein when the authentication print settings are made, the processor performs processing for selecting one of transfer of the image data in response to input of the authentication information and transfer of the image data regardless of input of the authentication information according to information on the received image data.

5. The image processing apparatus according to claim 4, wherein the processor performs the processing for selecting the one according to a transmission source of the received image data.

6. The image processing apparatus according to claim 1, wherein
the processor further receives from an operator an operation to designate a user who receives the received image data; and
notifies the designated user to designate at least one of print processing and transfer processing to the different apparatus as processing of the image data.

7. The image processing apparatus according to claim 1, wherein when the authentication print settings are cancelled, the processor transfers to the different apparatus image data which has not been transferred to the different apparatus.

8. The image processing apparatus according to claim 1, wherein
the processor further prohibits image data from being received, the image data having a volume greater than free space of a storage that stores image data which has not been transferred.

9. The image processing apparatus according to claim 1, wherein when the image data is received, which has a volume greater than free space of a storage that stores image data which has not been transferred, the processor deletes image data stored in the storage in chronological order of receiving time.

10. A non-transitory computer readable medium storing a program causing a computer to execute a process for implementing functions of the process comprising:

making authentication print settings such that when authentication information is inputted after image data is received, printing is executed based on the image data;

determine whether the image data is received with the authentication print settings;

when the image data is received without the authentication print settings, transfer the image data to a different apparatus other than a transmission source of the received image data regardless of input of the authentication information; and when the image data is received with the authentication print settings, determine whether the authentication information has been inputted;

when receiving input of the authentication information, selecting one of printing only, transfer only, and both printing and transfer based on the authentication print settings, wherein the printing only is selected in which only printing is performed based on the image data is selected when the transmission source exchanges confidential information;

the transfer only in which the transfer of the image data to the different apparatus is performed is selected when contents of processing are determined for the transmission source in the authentication print settings; and the both printing and transfer in which printing based on the image data and the transfer of the image data to the different apparatus are performed when the contents of processing are not determined for the transmission source in the authentication print settings.

* * * * *